Jan. 8, 1952     G. A. SPENCER     2,581,918
FOAMING APPARATUS
Filed Feb. 3, 1950     3 Sheets-Sheet 1
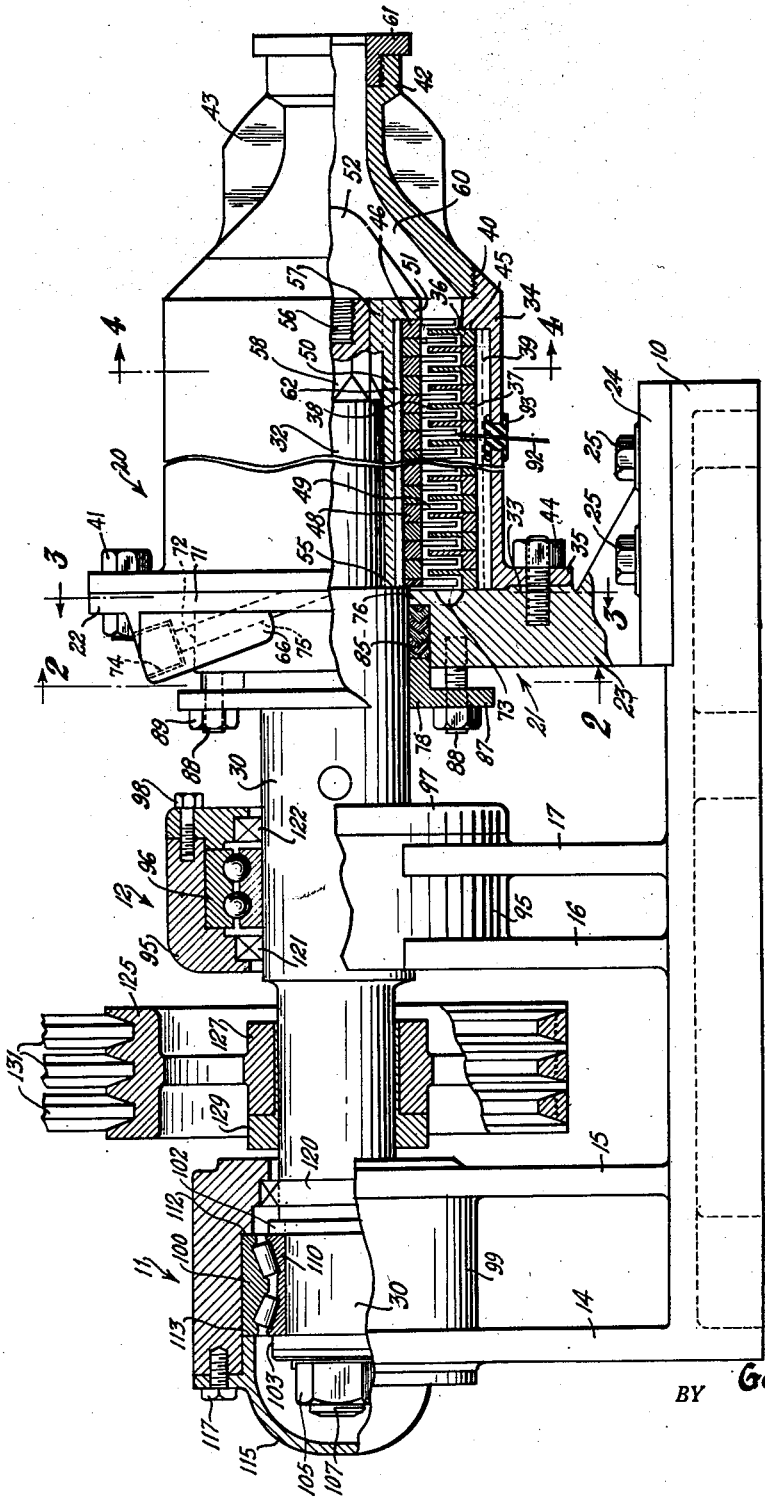
INVENTOR.
George A. Spencer
BY Ely & Frye
ATTORNEYS Jan. 8, 1952   G. A. SPENCER   2,581,918
FOAMING APPARATUS
Filed Feb. 3, 1950   3 Sheets-Sheet 2
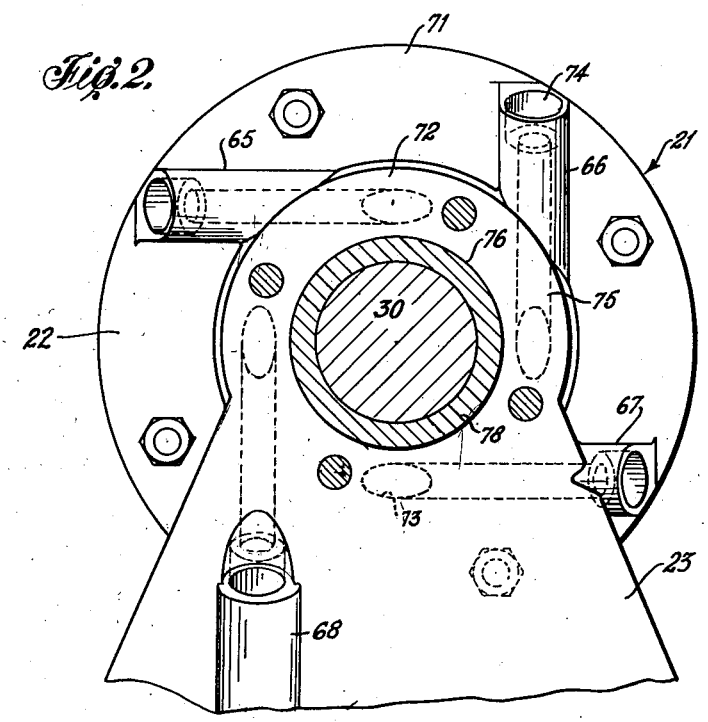
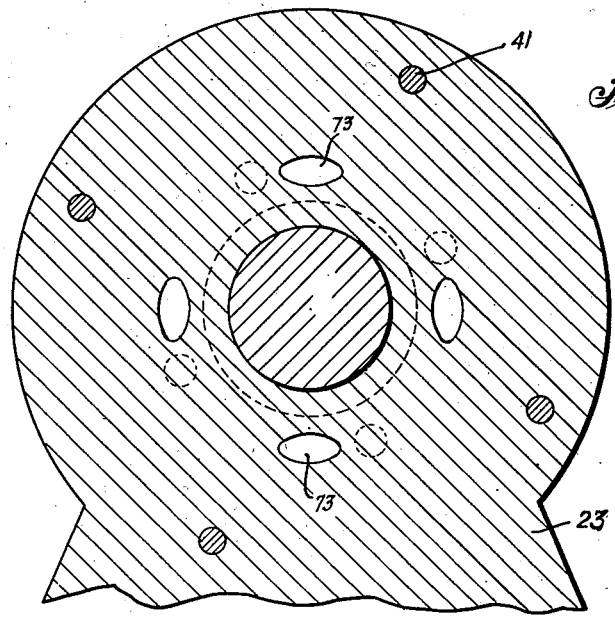
INVENTOR.
George A. Spencer
BY
Clyt Frye
ATTORNEYS Jan. 8, 1952   G. A. SPENCER   2,581,918
FOAMING APPARATUS Filed Feb. 3, 1950   3 Sheets-Sheet 3

INVENTOR.
George A. Spencer
BY
ATTORNEYS

Patented Jan. 8, 1952

2,581,918

UNITED STATES PATENT OFFICE 2,581,918

FOAMING APPARATUS

George A. Spencer, Akron, Ohio, assignor to The Firestone Tire & Rubber Company, Akron, Ohio, a corporation of Ohio Application February 3, 1950, Serial No. 142,275

8 Claims. (Cl. 259—9)

This invention relates to improvements in foaming apparatus.

A primary object of the invention resides in the provision of improved and simplified foaming apparatus particularly adapted for use in the foaming of latex and like materials.

An important object of the invention is to provide an apparatus in which a viscous material such as compounded rubber latex may be introduced to be vigorously beaten or mixed in the presence of a metered amount of air for the production of a foamed product of uniform texture.

Another object of the invention is to provide foaming equipment of high output capacity as compared to existing equipment, and which in effect is self-cleaning to the extent that undesirable deposits, which necessitate frequent cleaning of existing equipment, are either eliminated or minimized in a manner so that the normal operation of the equipment is not affected thereby.

Another object is to provide improved foaming equipment particularly adapted for the metered introduction of the product to be foamed, the air with which it is to be foamed, and certain additives, the latter being introduced subsequent to the initial stages of foaming.

Still another object of the invention is to provide foaming equipment of rugged construction, manufacturable at relatively low cost as compared to existing equipment, and requiring minimum maintenance and cleaning during continuous use.

Another object of the invention is to provide foaming equipment which offers the above-outlined advantages over existing equipment, and does so while presenting a substantially lower internal back pressure than heretofore obtained by any known type of equipment of comparable output capacity and physical dimensions.

An important object of the invention resides in the provision of a high speed foaming unit of improved design and offering a uniform axial flow path to the passage of material therethrough while said material is being continuously mixed with air and other ingredients, to maintain a uniform pressure-area relationship throughout the entire foaming cycle for the purpose of obtaining an end product of uniform cell construction.

Another important object of the invention is to construct a high speed mixer, the mixing elements of which may easily be regrouped in a manner to vary the axial spacing thereof for the purpose of readily adapting the mixer for use with liquid ingredients of widely varying viscosity, or alternately, to vary, through wide limits, the output rate of the mixer.

Still other objects and advantages will become apparent to persons skilled in the art upon examination of the drawings, the specification, and the appended claims.

In the drawings, in which like parts are identified by the same reference numerals throughout the various views, Fig. 1 is an elevational view, partially sectionalized along the axis of the apparatus shown, and illustrating a mixing apparatus incorporating a preferred embodiment of the present invention;

Fig. 2 is a sectional view taken along line 2—2 of Fig. 1;

Fig. 3 is a sectional view along line 3—3 of Fig. 1;

Figure 5:
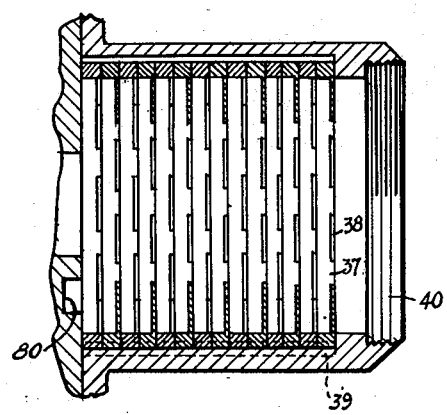
Fig. 5 is a diametric section of the stator portion of the mixer, showing disposition of the fixed blades.

As best shown in Fig. 1, the device may include a foundation or base 10, of suitable construction, such as a metal casting or stamping, journal assemblies 11 and 12, supported above base 10 by suitable brackets 14, 15 and 16, 17, respectively; a mixing unit generically designated 20, a casting 21 serving as a closure member for unit 20, and including a bracket portion 22 for the rigid support of the mixer unit 20, preferably in the horizontal position shown. Journal supporting brackets 14, 15 and 16, 17 may be cast en block with supporting base 10 to constitute upright integral extensions thereof, or may be otherwise fixed to base 10, for example by being welded or bonded thereto. Bracket 22 may be of stainless metal in the event the mixer is to be employed for the foaming of latex which is normally compounded with corrosive ingredients, and includes a generally planate portion 23, suitably apertured as hereinafter described, leading into a base portion 24 clamped to the face of a recessed portion of base 10, by clamping bolts 25.

Figure 4:
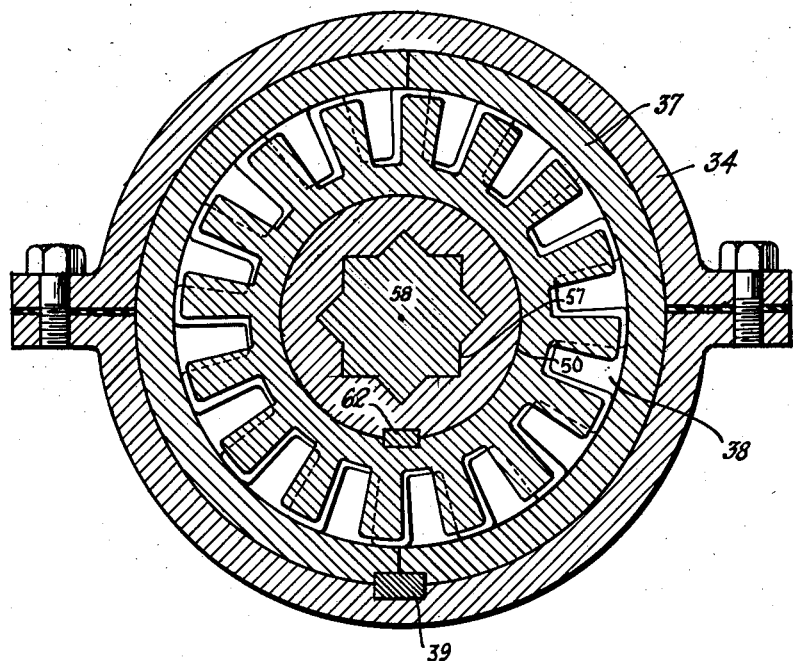
Fig. 4 is a section taken along line 4—4 of Fig. 1.

A shaft 30, rotatably supported in journal assemblies 11 and 12, extends through an aperture provided in closure member 21 and into the mixing unit. A rotor assembly within mixer unit 20, as shown in Fig. 1, is mounted on a reduced diameter portion 32 of shaft 30 in fixed relation thereto. The stator portion of unit 20 includes a cylindrical housing 34 radially flanged at 35 for mounting to an annular integral centering rib 33 on casting 21, by means of clamping bolts 44 and 41. Housing 34 provides support for a plurality of axially positioned stator elements 36, each of which includes a base portion 37 and integral blade portions 38, of reduced thickness, and circumferentially disposed at regular intervals as shown in Figs. 4 and 5. The bases 37 of stator elements 36 are of an axial dimension to permit said elements, when assembled as shown, to be maintained in unitary clamped assembly between annular shoulder 45 of housing 34, and the planate surface of bracket portion 23, by means of clamping pressure applied by clamping bolts 44 and 41. A locking key 39, also shown in Fig. 4, is axially disposed in suitable grooves to lock the base members 37 of the stator elements 36 to housing 34 to prevent relative rotation therebetween. The unsupported end of housing 34 is internally threaded at 40 for the threaded reception of an outlet spout 42, preferably a casting, provided with circumferentially spaced integral lugs 43 to facilitate assembly and removal of the outlet spout.

The rotor assembly within mixer unit 20, above mentioned as being mounted on reduced portion 32 of shaft 30 in fixed relation thereto, includes a plurality of axially mounted rotor elements 46, similar to stator elements 36 to the extent that each rotor element 46 is provided with an annular base portion 48 and integrally extending circumferentially spaced blade portions 49 of substantially reduced thickness as compared to the base portion. During assembly of the unit 20, the rotor elements 46 are concentrically received on a sleeve 50, provided at its outer end with a radially flanged portion 51 defining an annular shoulder against which the rotor element first mounted abuts. Sleeve 50, with rotor elements 46 mounted thereon, is then mounted as shown over the outer end of shaft portion 32. The base portions 48 of rotor elements 46 are of a thickness to insure positive clamping of said elements in unitary assembly when sleeve 50 is securely clamped against annular shoulder 55 defined by the reduced portion 32 of shaft 30. Sleeve 50 and rotor elements 46 are maintained in clamped assembly, as above described, by a contoured cap member 52, provided with a head screw 56 for threaded engagement with a suitable bore provided in the end of shaft portion 32.

As shown in the broken view, Fig. 1, sleeve 50 is interiorly provided with a splined section 57 for registry with a mating spline section 58, provided exteriorly of shaft portion 32 throughout an end portion thereof, to constrain sleeve 50 against relative rotation in respect to shaft 30. The base of cap element 52 is of a diameter for registry with the flanged portion 51 of sleeve 50 to provide a smoothly contoured diverging exit channel 60 for the foamed product as it leaves the blade assembly portion of the device to enter a connecting collar 61. An axially extending key 62, shown in Fig. 4, prevents relative rotation between the rotor blade assembly and sleeve 50.

As best shown in Fig. 2, a plurality of inlet nozzles are preferably provided for the purpose of equalizing the rate of material introduction to the device. While four such nozzles 65, 66, 67, and 68 are shown in 90° angularity, it is understood that one or more nozzles may be employed, depending upon the characteristics of the material to be treated. In the device illustrated, nozzles 65 through 68 are integrally cast in the closure casting 21. Bracket portion 23, of closure casting 21, as shown in Fig. 1, leads upwardly into a semi-circular closure plate portion 71 of reduced thickness, the central portion of closure plate 71 being of thicker section, as at 72, than the marginal areas thereof. Nozzles 65 through 68 are disposed diagonally in respect to closure plate portion 71, each nozzle being provided with an inlet bore 74 leading into a reduced bore 75 extending through closure plate 71 to terminate at a position radially outwardly of a centrally disposed cylindrical aperture 76 provided for reception of shaft 30 and packing gland housing 78. The relative position of the apertures defining the terminus of bores 75 is best shown at 73, Fig. 3. The disposition of the nozzle bores 75 is such as to terminate in registry with the annular chamber defined intermediate the base portions of stator assemblies 36 and rotor assemblies 46, in which both the stator blades and rotor blades are disposed, to feed the material to be foamed directly against the first circumferential series of rotor blades, as shown at 73, Fig. 1.

For the purpose of preventing the material, entering housing 34 through nozzles 65 through 68, from working through casting 23 between aperture 76 therein and shaft 30, a conventional sealing gland is provided. This gland comprises a non-metallic sealing ring 85 and a retaining ring 78 flanged at 87 to permit clamped engagement of plural clamping bolts 88 threadedly engaged in casting 21 and provided with nuts 89.

Since it may be desirable to introduce additives to the material after either partial or complete foaming has been effected, housing 34 may be provided with one or more hypodermic type injection needles, such as needle 92 extending from the exterior to the interior of housing 34. A convenient method of introducing such a needle is through the provision of a rubber plug 93, confined under compression within a suitable housing aperture. For example it may be desirable to introduce a gelling agent at a given point along the axial length of housing 34 at a position such as shown, wherein the gelling agent is introduced into the foam in a manner to be thoroughly mixed therewith during the passage of the foam during travel thereof through the remainder of the mixer and prior to exit through the annular channel 60.

The construction of channel assemblies 11 and 12 may be in any conventional manner. Assembly 12 as shown may include an annular housing 95, which may be integral with upright brackets 16 and 17. A suitable ball bearing assembly 96 is disposed within housing 95 and constrained against axial displacement by a closure plate 97, clamped to housing 95 by plural stud bolts 98. In a like manner, journal assembly 11 may include a housing 99, integral with upright brackets 14 and 15 and adapted to receive a ball bearing assembly 100 which may be of the type adapted to receive axial thrust of shaft 30. This type of conventional bearing requires that shaft 30 be provided with a radially extending rib 102 and with an end collar 103 retained by nut 105 which threadedly engages a reduced and threaded extension 107 of shaft 30. Inner race 110 of ball bearing assembly 100 is maintained clamped between annular rib 102 and collar 103 to rotate with shaft 30, while the outer race of ball bearing assembly 100 is maintained clamped between an annular shoulder 112 of housing 99 and the inner walls 113 of a housing-like cap assembly 115, clamped to housing 99 by a plurality of stud bolts 117. Suitable oil-retaining seals 120, and 121, 122 are provided in journal assemblies 11 and 12 respectively for the retention of bearing lubricant in a conventional manner.

A suitable driving pulley 125, which may be of the type to receive multiple V-belts, as shown, is mounted to shaft 30 intermediate journal assemblies 11 and 12. The hub 127 of pulley 125 is of course locked against rotation in respect to shaft 30 in any suitable manner, such as through a splined collar 129 which may be keyed to shaft 30 in a manner not shown. Power may be applied to pulley 125 through plural V-belts 131 which may be driven directly from a motor shaft pulley or through conventional reduction mechanism. It is understood that the drive mechanism is merely illustrative, since it may be desired to drive shaft 30 by direct coupling to the shaft of a motor which maintains a proper fixed speed, or in any other conventional manner.

The advantages of the above described mixing apparatus are numerous, but outstanding among these advantages are the reduction of over-all dimensions as compared to existing equipment and freedom from the necessity of frequent cleaning during use. Heretofore mixers adapted for the foaming of such material as latex and working on the principle of fixed and rotary vanes, have been of the so-called "radial" type, wherein the material to be foamed is introduced at a position radially inwardly of the blades, to be centrifugally thrown outwardly prior to passage through the blade structure. In this type of mixer there is of necessity an internal volume which is large in comparison to the volume of the effective annular mixing path. It is therefore not possible to maintain a uniform pressure-volume relationship within the device, since the work material is subjected to a higher pressure while actually passing through the effective mixing path than it is subjected to either prior to or subsequent to leaving that path but prior to exit from the mixer. It is well known that variations in the pressure-volume relationship within the mixer results in a foam of poorer quality and texture than is obtainable when uniformity of the pressure-volume relationship is maintained. The elimination, in the present mixer, of an inactive central chamber not only permits substantial reduction in the diameter of the device, but totally eliminates the highly undesirable condition of maintaining an inactive central chamber which has been proved highly detrimental to the production of quality foam.

In actual practice, a device designed to run at speeds between 1150 and 1175 R. P. M. may include a mixer unit the housing of which has an outside diameter of no more than 7 or 8 inches. In such a device the effective annular mixing chamber, defined between the base of the rotor and stator blade assemblies, may have a mean diameter of, for example, 6 inches and a radial width of 1 inch or less. While such a mixer, working on axial flow, is of greatly reduced diameter as compared to the radial type of mixers heretofore employed, the volume output is as great or greater due to the absence of constricting orifices which have limited the output of the types heretofore known. For example, a mixer of the dimensions indicated above and operating at the speeds mentioned has a normal output in excess of 1,000 pounds of foamed latex per hour. The method of introducing material to be foamed directly into the annular mixing chamber, coupled with the absence of "blow-by" which is the passing of unwanted air through mixers of the former type, plus the free flow of the mixed product to the outlet nozzle, all combine substantially to increase the output capacity of the present mixer over any known type of comparable horsepower rating. For example, a known type of mixer approximately 20 inches in outside diameter, 6 inches in axial length, and requiring 7½ horsepower input for the foaming of latex at 350 R. P. M. operating speed, has a constant output capacity of 800 pounds of foamed rubber per hour. Applicant's mixer, operating at 1150 R. P. M., maintains an internal pressure in the range of five to ten pounds per square inch, whereas the 20 inch 7½ horsepower input mixer mentioned above operates in the range of 25 to 30 pounds internal pressure. A high internal pressure will of course promote expansion of the material at the outlet spout, due to pressure differential in respect to the atmosphere, resulting in larger bubbles and a resulting coarser foam. Since smooth texture of the end product is desirable, decrease in bubble size is the ultimate goal of any such mixer, at least when employed for the foaming of latex.

As best shown in Fig. 5, the disposition of the stator blade assemblies is such that the radial extending blades 38 of each blade assembly are staggered circumferentially in respect to the blades of the immediately adjacent assembly to restrict free flow of the material between the several series of blades. Thus the material entering the mixing chamber at 73 must not only pass through the rapidly rotating stator blades, with a small amount passing between the ends thereof and the stator housing, but must follow a tortuous path presented by the circumferentially overlapping disposition of the stator blades. It is apparent, therefore, that while the work material is not subjected to undesirable variations in chamber volume as it passes through the mixer, which has resulted in "blow-by" in the prior art devices mentioned, complete admixture of the material, with air introduced therewith in metered quantity, is assured by the vigorous agitation to which the material is subjected during movement through said tortuous path while constantly subjected, during passage between the stator blades, to violent agitation by the rapidly moving rotor blades.

The precise disposition of both the stator blades and the rotor blades is of course a matter of choice, so long as they are not arranged in a manner to permit, under some conditions, a low resistance path of travel. It may be found desirable to utilize a unitary housing assembly to which the stator blades are affixed. By proper disposition of the blades therein, a stator assembly, the blades of which are disposed in a generally helical configuration, may be inserted and removed by a so-called threading operation in which the stator assembly is worked into the rotor assembly by a rotary movement. In this adaptation of the invention, the dimensional limitations of the blades may be empirically determined, in respect to the normal operating speed of the device, to eliminate what would amount to a low resistance substantially open path, allowing transfer of material through the device without proper mixing. While the adaptation shown includes a plurality of both rotor and stator blade assemblies with an equal number of evenly spaced blades on each assembly along the axis of the device, it may be found desirable, especially for the proper mixing of certain materials, to vary the blade size and the circumferential spacing on each or some of the assemblies, as well as the axial spacing therebetween. Thus a mixing device incorporating all of the principles taught herein might be of a design whereby the incoming material and the air metered therewith is subjected to a modest mixing action during the first stage of axial flow through the device, to be subjected to progressively increasing agitation during continued axial flow therethrough, or conversely a complete reversal of this suggested arrangement might, under other circumstances, be desirable.

It is of course understood that the improved mixer described has wide applicability, and that its use for the foaming of latex, as well as the precise mechanical details included for purpose of exemplification are not to be construed as limitations.

What is claimed is:

1. An apparatus for continuous production of foamed liquid-air mixtures, which comprises a central shaft with a plurality of journal supports, an auxiliary support, through and beyond which said shaft extends, a housing secured to said auxiliary support, cantilever fashion, and in surrounding relation to the extension of said shaft and having an exit passage axially aligned with said shaft, a series of spaced stator plates interiorly of said housing having fingers arranged radially of said shaft, a series of spaced, rotor plates secured to said shaft and having fingers disposed radially of said shaft and extending into the spaces between pairs of said stator plates, said auxiliary support having charging openings communicating with the interior of said housing.

2. In a device as in claim 1, a generally conical head on the terminus of the said extension of said shaft, and the said exit passage on said housing having a converging form, defining, with said head, an annular, converging passage, leading to a final, tubular passage.

3. In a device as in claim 2, a sleeve surrounding said shaft and keyed thereto and to said rotor plates, a flange on said sleeve holding said plates in assembled relation, and said head being a separate member, secured to said shaft, and overlying said flange, whereby to hold said sleeve in position on said shaft.

4. A device as in claim 3, said sleeve having a splined connection with said shaft.

5. A device as in claim 4, said housing being demountable from said auxiliary support whereby said head may be removed for disassembly of said plates.

6. A device as in claim 1, said charging openings being arranged generally tangentially to a circle concentric with the axis of said shaft, and communicating at their termini directly with the space occupied by said fingers.

7. A device as in claim 1, said charging openings being arranged generally tangentially to a circle concentric with the axis of said shaft, and communicating at their termini directly with the space occupied by said fingers and arranged angularly to a plane perpendicular to the axis of said shaft.

8. A device as in claim 1, the fingers of said stator plates being staggered in succession so as to present only partial overlap in the adjacent fingers of adjacent plates.

GEORGE A. SPENCER.

REFERENCES CITED

The following references are of record in the file of this patent:

UNITED STATES PATENTS

| Number | Name | Date |
|---|---|---|
| 1,449,623 | Pfouts | Mar. 27, 1923 |
| 1,487,208 | Cooke et al. | Mar. 18, 1924 |
| 2,169,338 | Ditto | Aug. 15, 1939 |